United States Patent [19]
Kelley

[11] Patent Number: 5,586,521
[45] Date of Patent: Dec. 24, 1996

[54] PORTABLE PET WASTE CONTAINER

[76] Inventor: Richard D. Kelley, 3114 N. 25th, Tacoma, Wash. 98406

[21] Appl. No.: 336,307

[22] Filed: Nov. 8, 1994

Related U.S. Application Data

[63] Continuation-in-part of Ser. No. 69,445, Jun. 1, 1993, abandoned.

[51] Int. Cl.$^6$ .................................................. A01K 23/00
[52] U.S. Cl. ........................................................ 119/858
[58] Field of Search .................................. 224/148, 224, 224/225, 226, 252, 269; 294/1.3, 1.4, 1.5, 55; 119/95, 174, 725, 769, 791, 792, 793, 795, 850, 907

[56] References Cited

U.S. PATENT DOCUMENTS

| | | | |
|---|---|---|---|
| 2,784,720 | 3/1957 | Royle | 224/252 X |
| 3,767,247 | 10/1973 | Wetzler | 294/1.3 |
| 3,878,589 | 4/1975 | Schaefer | 224/269 X |
| 4,226,456 | 10/1980 | Barnett | 294/1.3 |
| 4,361,245 | 11/1982 | Allen et al. | 294/55 X |
| 4,605,335 | 8/1986 | Otrusina | 224/269 X |
| 4,718,586 | 1/1988 | Hagino | 224/269 X |
| 4,746,042 | 5/1988 | King | 224/252 X |
| 5,382,063 | 1/1995 | Wesener et al. | 294/1.3 |

*Primary Examiner*—Thomas Price

[57] ABSTRACT

A combination scoop-container for use by animal owners to conveniently and sanitarily recover excrement left by their dogs, the container being detachably secured to the animal's shoulder harness for toting the animal waste to a disposal facility. The container is detachable for use as a scoop in combination with a small shovel stored therewith to collect the waste into the container. The container has an angled open end covered by a pivotable lid closing the container when attached to the harness but rotating away from the opening when the container is used to scoop waste. A clip is provided that is mounted to the animal's shoulder harness, having a vertically-oriented, slotted channel, the channel open at its top and closed at its bottom to receive a flange attached to the scooper-container back such that the flange shoe slides into the channel at its top and is retained therein under force of gravity. The clip further provides a harness slot through with a harness strap is secured within the clip.

4 Claims, 3 Drawing Sheets

PORTABLE PET WASTE CONTAINER

This is a continuation-in-part of Ser. No. 08/069,445 filed in the United States Jun. 1, 1993, now abandoned.

BACKGROUND OF THE INVENTION

The present invention relates generally to pet care, and in particular to an apparatus for collection and disposal of outdoor animal messes such as dog feces.

When dogs defecate in public places, owners have no good way to collect and dispose of the mess. Convenient facilities to remove the mess are usually unavailable or unsanitary. Frequently, dog owners just leave the mess. Others carry a tissue to collect the feces, but disposal remains inconvenient.

It is known in the art to have collection apparatus for animal waste, but it is not known to have apparatus toted by the animal in which the waste is temporarily contained until means for proper disposal is available but which is easily and quickly removable for disposal of the waste. It is also not known to have such a container apparatus that also can be quickly and easily detached from an animal harness and used as a scooper to collect the feces into the container.

SUMMARY OF THE INVENTION

The principal object of the present invention is to provide a device for use by dog owners to conveniently and sanitarily recover excrement left by their dogs in public.

It is a further object to have the animal tote the device attached to an animal's shoulder harness. It is a further object to have the device easily and quickly removable from the shoulder harness for disposal of the waste. It is the final object that the container device also serve as a scoop in combination with a small shovel for collecting the waste from the ground into the container.

The foregoing objects are accomplished by having a container removably attached to a dog's shoulder harness. When mounted on the harness through the clip, the container is vertically oriented with a lid closing an angled top, pivoting from an upper point to cover the angled opening, such that the lid is biased to remain closed while hanging from the dog's harness through the lid being angled down.

When the container is separated from the harness at the clip, the lid may be pivoted open allowing the angled container opening to become a scoop. In combination with a small shovel, when the container is detached from the harness the scoop collects the animal mess into the container, from ground in the normal manner of a scoop and the container is then remounted onto the animal shoulder harness as the lid falls closed over the container top opening. The container may be lined with a disposable insert which is then discarded with any mess collected at a suitable facility.

DESCRIPTION OF THE PREFERRED EMBODIMENTS

Figure 2:
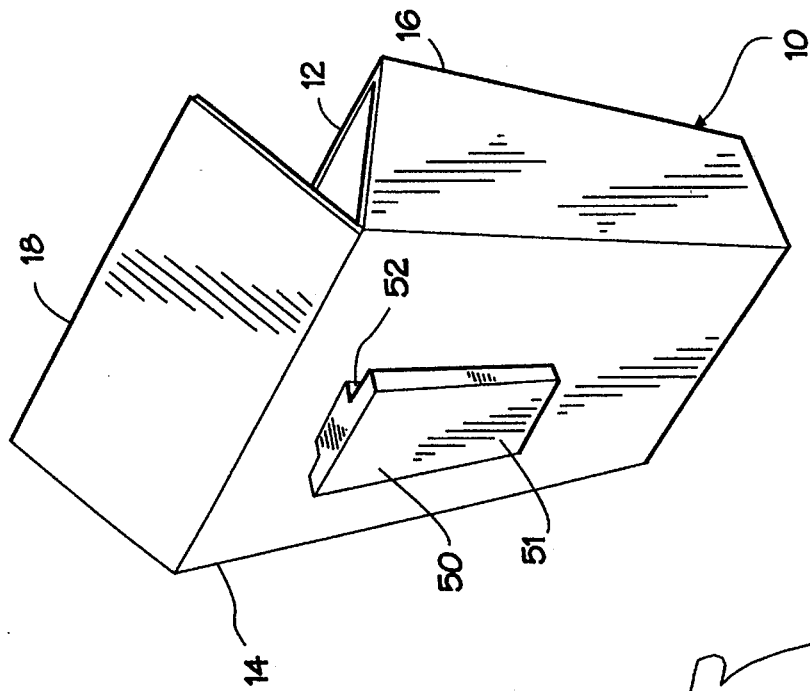
FIG. 2 is the back perspective view of the portable pet waste container.
Figure 1:
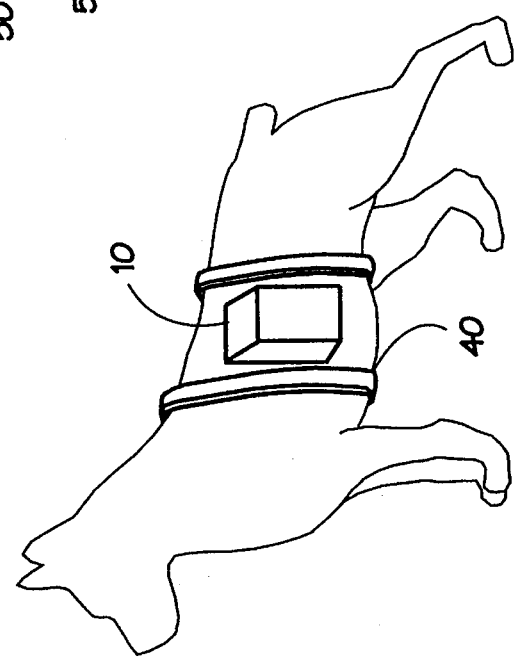
FIG. 1 is a perspective view of the scoop-container removably attached to an animal's shoulder harness.
Figure 3:
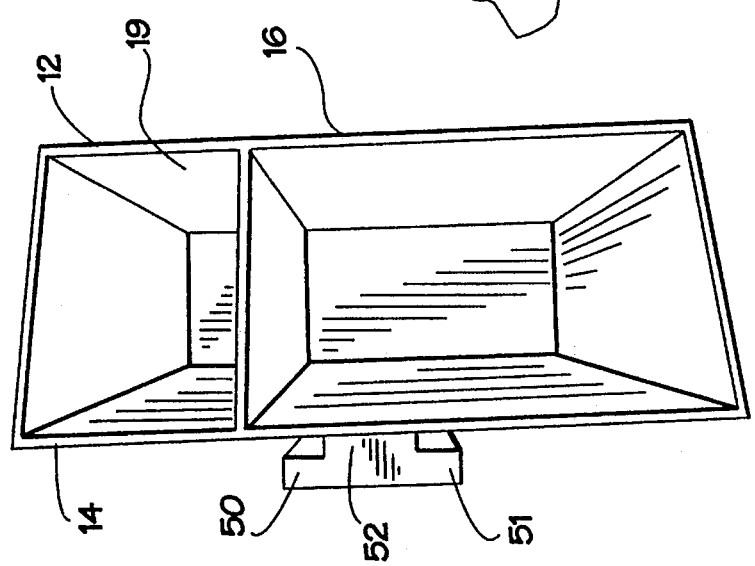
FIG. 3 is the top perspective view of the portable pet waste container.
Figure 5:
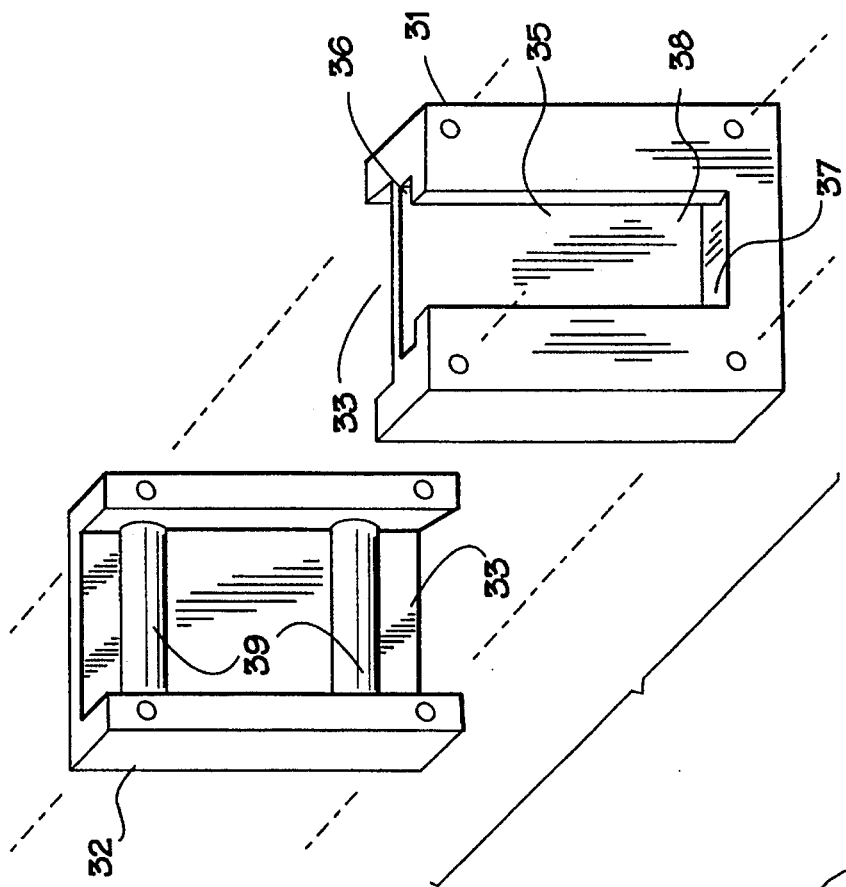
FIG. 5 shows the harness clip with harness strap channel.
Figure 4:
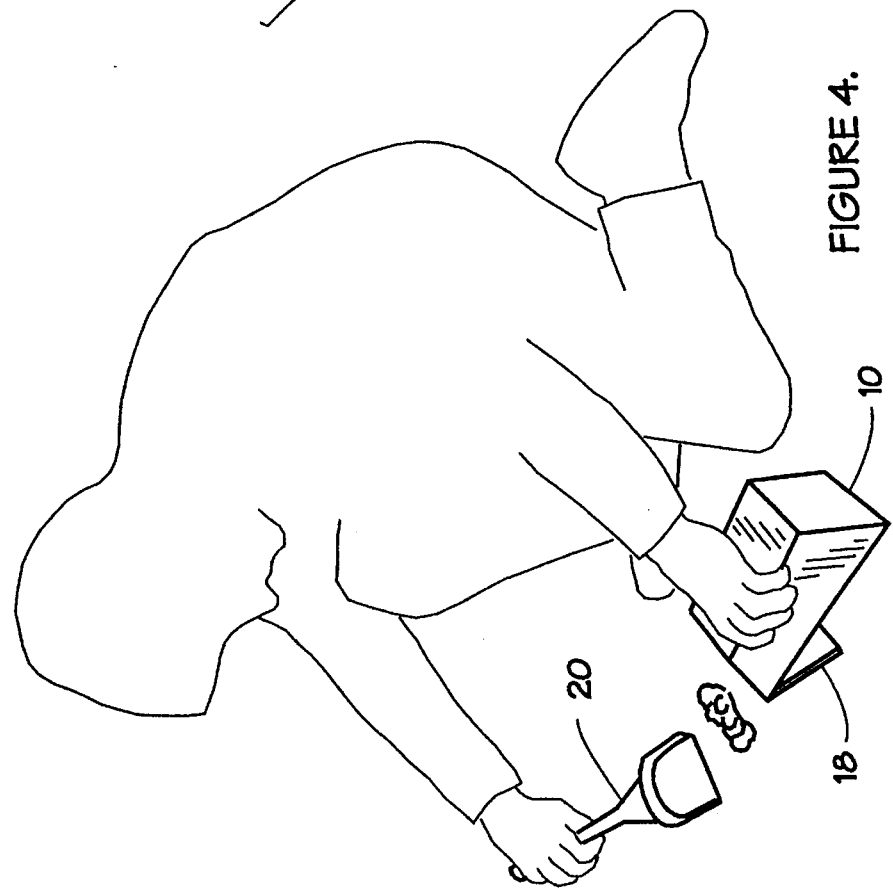
FIG. 4 is an artistic view of the scoop-container detached and used to collect animal waste in combination with a small shovel.
Figure 8:
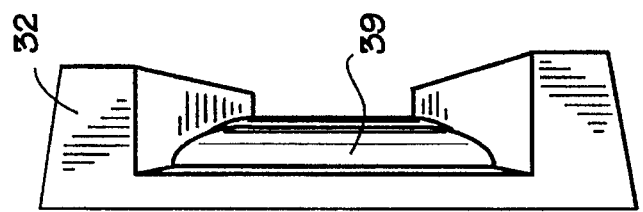
FIG. 8 shows the top perspective view of the harness clip rear member with protruding strap binders.
Figure 7:
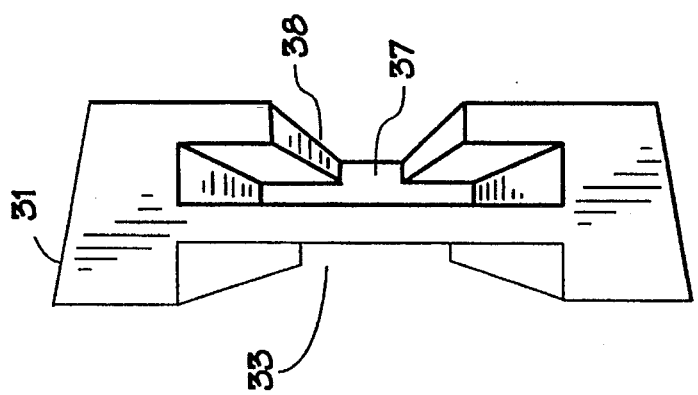
FIG. 7 shows the top perspective view of the harness clip front member with container flange canal.
Figure 6:
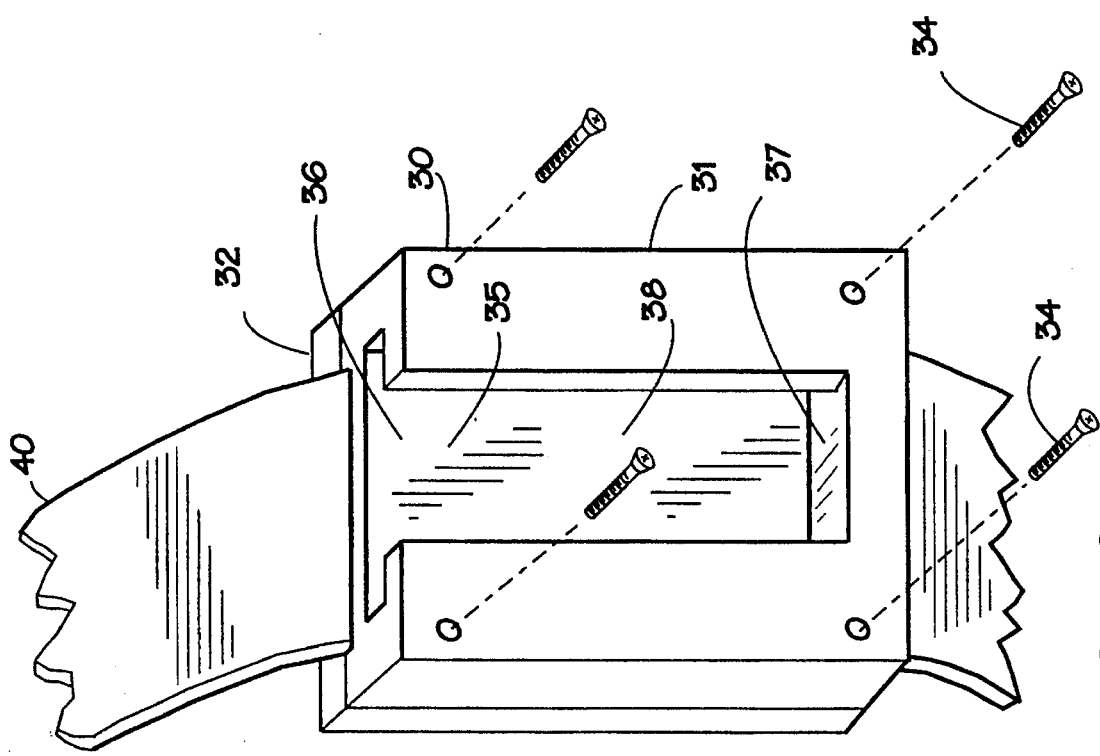
FIG. 6 shows the harness clip attached over a harness strap.

Referring to the figures, the present scooper-container comprises a container 10, a small shovel 20, and a coupling harness clip 30 for detachably mounting the scooper-container to an animal shoulder harness 40.

The container 10 has one end 12 open, angled from a high back side 14 to a lower front side 16 and covered with a flat lid 18 pivotably mounted on the high back side 14 so the lid 18 tends to remain closed over the open end 12 by gravity. The resultant angled open end 12 also serves as a scoop when the container 10 is detached from the animal shoulder harness 40 and the lid 18 is pivoted against and disposed opposite the container back side such that the flat lid is then directed generally toward the container closed end and away from the open end with the flat lid between the high back side and the ground, unobstructive to the open end of the container back side 14, fully exposing the open end 12 when the container back side is held close to the ground approximately parallel thereto in the normal mode of a scoop. The container 10 further has an inner chamber 19 divided from waste in the container 10 for storing a small shovel useful for scooping waste in the container when it is detached from the harness.

The coupling harness clip 30 mounted to the animal shoulder harness 40 comprises a front member 31 and a back member 32 disposed face to face with a harness slot 33 therebetween through which a harness strap 40 can pass, coupled together with any suitable means, such as screws 34. On the front member 31 is a vertically-oriented, flange canal 35 open at its top 36 and closed at its bottom 37, with a vertical slot 38 opening the canal 35 at the clip front.

On the back member 32 within the harness slot 33 is at least one strap binding bar 39 protruding into the harness slot 33 such that when the front and back members 31,32 are tightly coupled together, the binding bar 39 pushes a harness strap 40 against the front member 31 within the slot 33 opposite the binding bar 39, thereby securing the strap 40 firmly within the clip 30.

The container 10 further comprises a container flange 50 attached to the back 14 of the container and comprising a shoe 51 vertical in extent, sized to fit in the clip canal 35, and separated from the back 14 by a smaller waist 52. The flange shoe 51 then fits within the canal 35 with the flange waist 36 passing through the channel slot 31 such that the flange shoe 51 slides into the canal 35 at its top 36, retained therein under force of gravity.

Having described the invention, what is claimed is:

1. A portable combination scooper-container apparatus detachably secured vertically to an animal's shoulder harness for toting animal waste and for collecting the waste from ground in the normal manner of a scoop when detached from the harness, comprising a container with a low front side and a high back side and having an open end and a closed end with the open end angled from the high back side to the lower front side as a scoop, means to detachably mount the container to the animal's shoulder harness, a flat lid covering the container open end and pivotably mounted on the high back side of the container so the lid tends to remain closed over the open end by gravity and rotatable against and disposed opposite the container back side when the container is detached from the shoulder harness, such that the flat lid is then directed generally toward the container closed end and away from the open end with the flat lid between the high back side and the ground, unobstructive to the open end to fully expose the open end as a scoop, when the container back side is held close to the ground approximately parallel thereto in the normal mode of a scoop.

2. The invention of claim 1 wherein the means to detachably mount the container to the animal's shoulder harness is a coupling harness clip comprising a clip having means for attaching the clip to the animal shoulder harness and having a vertically-oriented, slotted canal with a top and a bottom, the canal being open at its top and closed at its bottom, a flange attached to the scooper-container back comprising a shoe and a waist smaller than the shoe separating the shoe from the container back such that the flange shoe fits within the canal with the flange waist passing through the canal slot such that the flange shoe slides into the canal at its top and is retained therein under force of gravity, a harness clip front member, a harness clip back member disposed face to face and coupled together with the front member with a recess in one or more of the members such that a harness slot is formed therebetween through which a harness strap can pass, on one member within the harness slot, at least one strap binding bar protruding into the harness slot such that when the front and back members are tightly coupled together, the binding bar extends one member within the slot toward the opposite member such that when a harness strap is placed within the slot it is pushed by the binding bar against the opposite member thereby securing the strap firmly within the clip.

3. The invention of claim 1 in combination with a small shovel for moving animal waste into the container on the ground in scoop orientation.

4. The invention of claim 3 in which the container further comprises a divided compartment for storing a small shovel.

* * * * *